(12) United States Patent
Wei (10) Patent No.: US 10,802,621 B2
(45) Date of Patent: Oct. 13, 2020

(54) TOUCH PANEL

(71) Applicants: AU Optronics (Suzhou) Corp., Ltd., Suzhou (CN); AU Optronics Corporation, Hsin-Chu (TW)

(72) Inventor: Guang-Dong Wei, Suzhou (CN)

(73) Assignees: AU OPTRONICS (SUZHOU) CORP., LTD., Suzhou (CN); AU OPTRONICS CORPORATION, Hsin-Chu (TW)

( * ) Notice: Subject to any disclaimer, the term of this patent is extended or adjusted under 35 U.S.C. 154(b) by 136 days.

(21) Appl. No.: 16/001,197

(22) Filed: Jun. 6, 2018

(65) Prior Publication Data

US 2019/0079605 A1 Mar. 14, 2019

(30) Foreign Application Priority Data

Sep. 11, 2017 (CN) .......................... 2017 1 0810073

(51) Int. Cl.
  *G06F 3/041* (2006.01)
  *G06F 3/044* (2006.01)
(52) U.S. Cl.
  CPC .............. *G06F 3/041* (2013.01); *G06F 3/044* (2013.01); *G06F 2203/04111* (2013.01)
(58) Field of Classification Search
  None
  See application file for complete search history.

(56) References Cited

U.S. PATENT DOCUMENTS

| | | | |
|---|---|---|---|
| 7,786,981 B2 | 8/2010 | Proctor | |
| 8,440,920 B2 | 5/2013 | Bulea et al. | |
| 9,081,415 B2 * | 7/2015 | Fukushima | ........... G06F 3/0446 |
| 9,280,241 B2 * | 3/2016 | Lee | ........................ G06F 3/044 |
| 2009/0085885 A1 * | 4/2009 | Wu | ....................... G06F 3/0445 345/173 |
| 2009/0273573 A1 | 11/2009 | Hotelling | |
| 2010/0007626 A1 * | 1/2010 | Lai | .......................... G06F 3/044 345/174 |
| 2016/0048246 A1 * | 2/2016 | Park | ........................ G06F 3/044 345/173 |

(Continued)

FOREIGN PATENT DOCUMENTS

CN           204360355 U        5/2015

*Primary Examiner* — Andre L Matthews
(74) *Attorney, Agent, or Firm* — WPAT, PC (57) ABSTRACT

A touch panel includes a substrate, first to third touch electrode series, and a plurality of insulation patterns. The first touch electrode series includes first and second portions respectively extending along first and second directions. The second touch electrode series includes third and fourth portions respectively extending along third and second directions. The third portion intersects with the first portion of the first touch electrode series. The third touch electrode series includes fifth and sixth portions respectively extending along the first and third directions. The fifth and sixth portions respectively intersect with the fourth portion of the second touch electrode series and the second portion of the first touch electrode series. The first to third directions are different from each other. The plurality of insulation patterns respectively insulate the first touch electrode series from the second touch electrode series, the second touch electrode series from the third touch electrode series, and the first touch electrode series from the third touch electrode series.

15 Claims, 8 Drawing Sheets

(56) References Cited

U.S. PATENT DOCUMENTS

2017/0177159 A1* 6/2017 Cao ................. G06F 3/0418
2017/0309247 A1  10/2017 Hung et al.
2018/0113345 A1* 4/2018 Song ................. G06F 3/044
2018/0210577 A1* 7/2018 Chan ................. G06F 3/044
2018/0341349 A1* 11/2018 Sunada ............. G02F 1/13338

* cited by examiner

TOUCH PANEL

BACKGROUND

Technical Field

The present invention relates to a touch panel, and in particular, to a touch panel on which touch sensing electrodes may be uniformly distributed.

Related Art

In recent years, touch panels develop rapidly, and particularly, capacitive touchscreen technology is widely used in digital products such as mobile phones, computers, tablet computers, smartwatches and smart bands. Capacitive touchscreens have a very wide application range, and structurally include a self-capacitance (self-mode) touchscreen and a mutual-capacitance (mutual-mode) touchscreen. Because multi-touch can be implemented on mutual-capacitance touchscreens, mutual-capacitance touchscreens are the mainstream in the current capacitive touchscreen market.

At present, touch panels in nearly all commercially available electronic devices including mobile phones, tablet computers, digital cameras, and smartwatches have a rectangular shape. When a touch panel having another shape needs to be made, corresponding wiring inside the touch panel is a major difficulty. A problem of poor touch sensitivity at edges may occur due to the lack of a desirable wiring manner. In addition, how to distribute touch sensing electrodes with uniform density is another difficulty.

SUMMARY

In multiple embodiments of the present invention, three touch electrode series intersect with each other, and each touch electrode series includes two portions extending along different directions. In this way, the touch electrode series can adapt to a substrate that has a hexagonal shape or even a circular shape. This setting can reduce a quantity of the touch electrode series, thereby reducing a quantity of leads to obtain a narrow bezel, and has a relatively low requirement for the performance of a drive chip and an I/O quantity. In addition, with the setting of a circular panel, leads need to be distributed on only a half of a peripheral area PA, and an area requirement for the peripheral area can be reduced. Moreover, for a touch electrode series adjacent to the peripheral area, an extra connection cable may be designed to enhance touch sensitivity at edges.

According to some embodiments of the present invention, a touch panel includes a substrate, a plurality of first touch electrode series, a plurality of second touch electrode series, a plurality of third touch electrode series, and a plurality of insulation patterns. The substrate includes a display area and a peripheral area. Each first touch electrode series includes a first portion extending along a first direction and a second portion extending along a second direction. Each second touch electrode series includes a third portion extending along a third direction and a fourth portion extending along the second direction, and the third portion intersects with the first portions of at least some of the first touch electrode series. Each third touch electrode series includes a fifth portion extending along the first direction and a sixth portion extending along the third direction, the fifth portion intersects with the fourth portions of at least some of the second touch electrode series, and the sixth portion intersects with the second portions of at least some of the first touch electrode series. The first to third directions are different from each other. The plurality of insulation patterns are respectively configured to insulate the first touch electrode series from the second touch electrode series, are configured to insulate the second touch electrode series from the third touch electrode series, and are configured to insulate the first touch electrode series from the third touch electrode series.

In some embodiments of the present invention, each first touch electrode series includes a first touch electrode, each second touch electrode series includes a second touch electrode, each third touch electrode series includes a third touch electrode, and the first touch electrodes, the second touch electrodes, and the third touch electrodes are formed by using a same patterned electrode layer.

In some embodiments of the present invention, each first touch electrode, each second touch electrode and each third touch electrode have a strip form, a rectangular shape, or a diamond-like shape.

In some embodiments of the present invention, the touch panel further includes a lead structure, respectively connected to the first portion of each first touch electrode series, the third portion of each second touch electrode series, and the fifth portion of each third touch electrode series.

In some embodiments of the present invention, an included angle between the first direction and the second direction is 120 degrees.

In some embodiments of the present invention, an included angle between the first direction and the third direction is 120 degrees.

In some embodiments of the present invention, the first touch electrode series includes an outermost first touch electrode series that is adjacent to the peripheral area, and the outermost first touch electrode series includes a peripheral bridge line that is located in the peripheral area and is configured to connect a first portion and a second portion of the outermost first touch electrode series.

In some embodiments of the present invention, the insulation patterns are located on the first touch electrode series, the second touch electrode series, and the third touch electrode series.

In some embodiments of the present invention, an innermost first touch electrode series, an innermost second touch electrode series, and an innermost third touch electrode series define a triangle therein.

In some embodiments of the present invention, the triangle is a regular triangle.

In some embodiments of the present invention, each first touch electrode series includes a first connection point connected between the first portion and the second portion, each second touch electrode series includes a second connection point connected between the third portion and the fourth portion, and each third touch electrode series includes a third connection point connected between the fifth portion and the sixth portion, where each first connection point and the innermost third touch electrode series overlap, each second connection point and the innermost first touch electrode series overlap, and each third connection point and the innermost second touch electrode series overlap.

In some embodiments of the present invention, an innermost first touch electrode series of the first touch electrode series, an innermost second touch electrode series of the second touch electrode series, and an innermost third touch electrode series of the third touch electrode series define a rhombus therein.

In some embodiments of the present invention, a vertex angle of the rhombus is 60 degrees.

In some embodiments of the present invention, the touch panel further includes a fourth touch electrode series, extending along the third direction and intersecting with at least some of the first touch electrode series.

In some embodiments of the present invention, each first touch electrode series includes a first connection point connected between the first portion and the second portion, each second touch electrode series includes a second connection point connected between the third portion and the fourth portion, and each third touch electrode series includes a third connection point connected between the fifth portion and the sixth portion, where each first connection point and the fourth touch electrode series overlap, each second connection point and the first portion of the innermost first touch electrode series overlap, and each third connection point and the second portion of the innermost first touch electrode series overlap.

In some embodiments of the present invention, the substrate has a circular shape or a hexagonal shape.

In some embodiments of the present invention, the first touch electrode series, the second touch electrode series, and the third touch electrode series are evenly spaced.

DETAILED DESCRIPTION

Multiple embodiments of the present invention are disclosed below with reference to the drawings. For clarity, many practical details are also described in the following description. However, it should be understood that these practical details are not intended to limit the present invention. That is, in some embodiments of the present invention, these practical details are not essential. In addition, for simplicity of the drawings, some conventional structures and components are shown in the drawings in a simplified schematic manner.

Figure 1A:
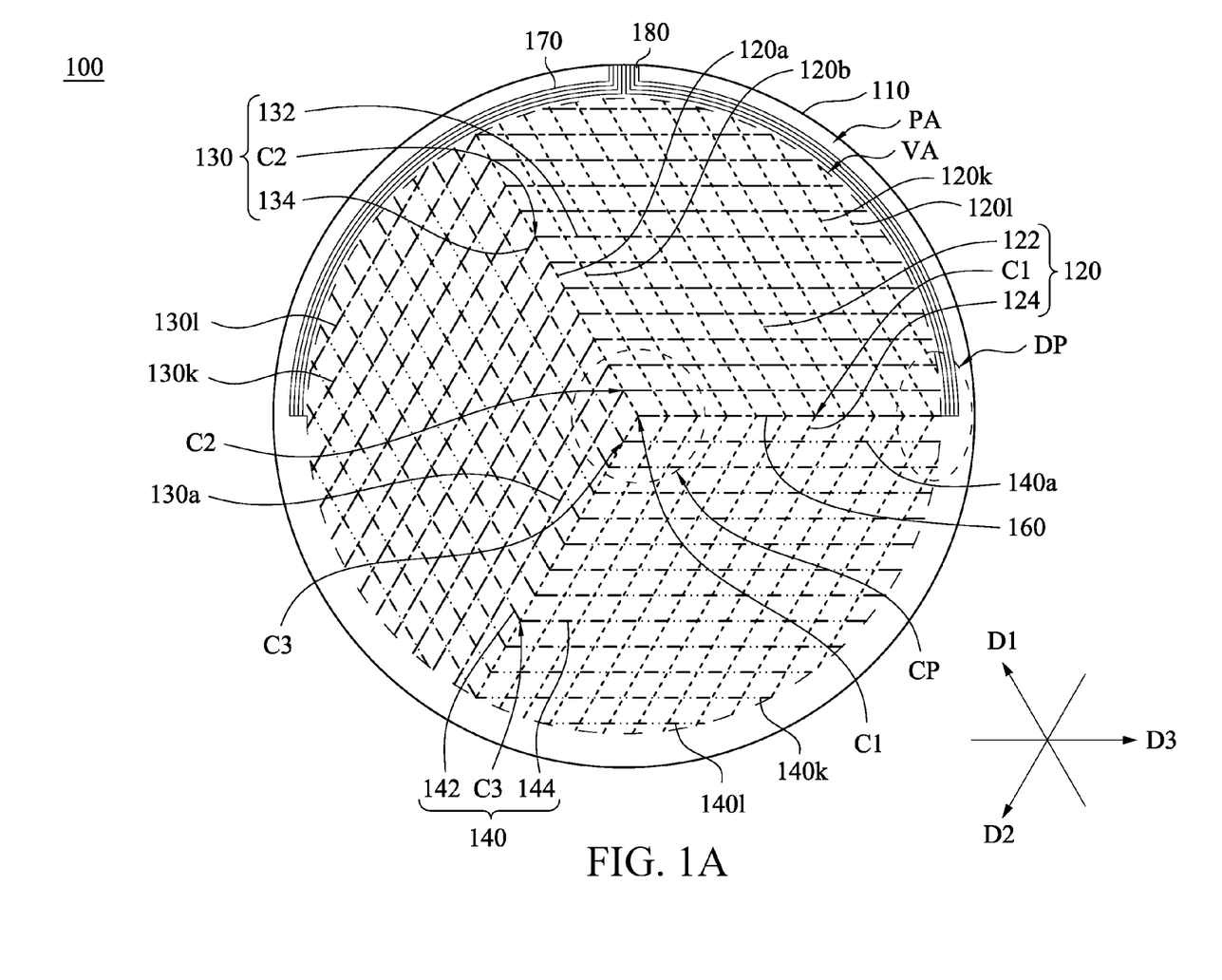
FIG. 1A is a schematic top view of a touch panel according to some embodiments of the present invention.

FIG. 1A is a schematic top view of a touch panel 100 according to some embodiments of the present invention. The touch panel 100 includes a substrate 110, a plurality of first touch electrode series 120, a plurality of second touch electrode series 130, and a plurality of third touch electrode series 140. The substrate 110 includes a display area VA and a peripheral area PA. The first touch electrode series 120, the second touch electrode series 130, and the third touch electrode series 140 are provided in the display area VA of the substrate 110, and extend to the peripheral area PA. The first touch electrode series 120 intersect with the second touch electrode series 130, the second touch electrode series 130 intersect with the third touch electrode series 140, and the first touch electrode series 120 intersect with the third touch electrode series 140. For example, from the top view, the first touch electrode series 120 includes an included angle, and two portions of the first touch electrode series 120 that extend from a corner to two sides respectively overlap and intersect with the second touch electrode series 130 and the third touch electrode series 140. In multiple embodiments of the present invention, the first, second, and third touch electrode series 120, 130, 140 are electrically insulated from each other.

In multiple embodiments of the present invention, touch electrode series are represented by different lines or patterns. For example, the first touch electrode series 120 is represented by a uniform dashed line, the second touch electrode series 130 is represented by a dashed line including long and short line segments, and the third touch electrode series 140 is represented by a dashed line including long segments and dots herein. It should be understood that this drawing manner is used to only present a concept of the present invention, and should not limit the scope of materials.

Figure 1B:
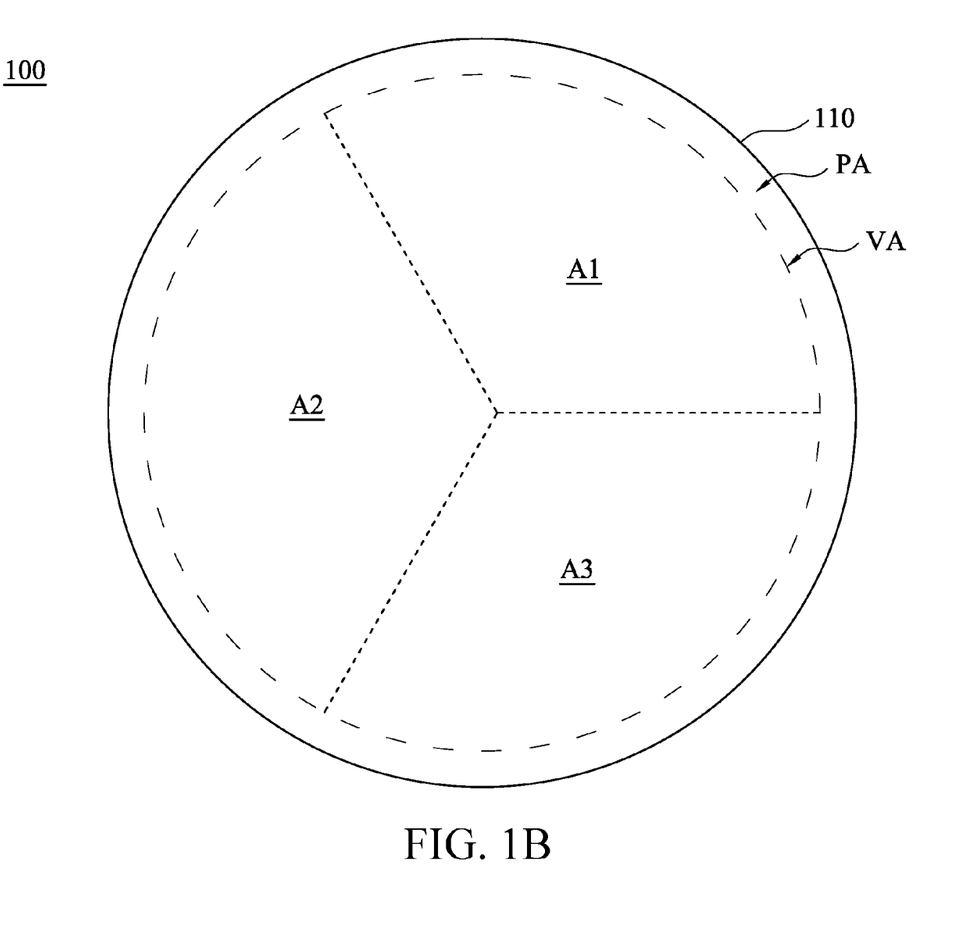
FIG. 1B is a schematic top view when the touch panel in FIG. 1A is operated.

FIG. 1B is a schematic top view when the touch panel 100 in FIG. 1A is operated. Referring to FIG. 1A and FIG. 1B, the display area VA of the substrate 110 may be divided into a first area A1, a second area A2, and a third area A3. In this way, a drive signal may be transmitted through the first touch electrode series 120, and a touch signal may be sensed by the second touch electrode series 130 and the third touch electrode series 140 to respectively obtain touch positions in the first area A1 and the third area A3. In addition, the drive signal may be transmitted through the second touch electrode series 130, and the touch signal may be sensed by the first touch electrode series 120 and the third touch electrode series 140 to respectively obtain touch positions in the first area A1 and the second area A2. In addition, the drive signal may be transmitted through the third touch electrode series 140, and the touch signal may be sensed by the first touch electrode series 120 and the second touch electrode series 130 to respectively obtain touch positions in the third area A3 and the second area A2.

It should be understood that persons of ordinary skill in the art may select an appropriate electrode series to transmit the drive signal, and does not necessarily drive all electrode series. For example, only the first touch electrode series 120 and the second touch electrode series 130 may be driven, and the touch signal may be sensed by the second touch electrode series 130 and the third touch electrode series 140.

The following describes structural configurations of the first touch electrode series 120, the second touch electrode series 130, and the third touch electrode series 140 in detail.

Referring to FIG. 1A and FIG. 1B, in some embodiments of the present invention, the first touch electrode series 120 includes a first portion 122 and a second portion 124 that have different extension directions, the second touch electrode series 130 includes a third portion 132 and a fourth portion 134 that have different extension directions, and the third touch electrode series 140 includes a fifth portion 142 and a sixth portion 144 that have different extension directions. In some embodiments of the present invention, in the first area A1, the third portion 132 of the second touch electrode series 130 intersects with the first portion 122 of the first touch electrode series 120. In the second area A2, the fifth portion 142 of the third touch electrode series 140 intersects with the fourth portion 134 of the second touch electrode series 130. In the third area A3, the sixth portion 144 of the third touch electrode series 140 intersects with the second portion 124 of the first touch electrode series 120.

In this embodiment, the first portion 122 extends along a first direction D1, and the second portion 124 extends along a second direction D2. The third portion 132 extends along a third direction D3, and the fourth portion 134 extends along the second direction D2. The fifth portion 142 extends along the first direction D1, and the sixth portion 144 extends along the third direction D3. The first direction D1, the second direction D2, and the third direction D3 are different from each other. For example, an included angle between the first direction D1 and the second direction D2 is 120 degrees, an included angle between the first direction D1 and the third direction D3 is 120 degrees, and an included angle between the second direction D2 and the third direction D3 is 120 degrees. It should be understood that this angle should not limit the scope of the present invention. Persons of ordinary skill in the art may appropriately adjust the first direction D1, the second direction D2, and the third direction D3.

For convenience of description, from inside the display area VA to the peripheral area PA, the plurality of first touch electrode series 120 are sequentially marked as first touch electrode series 120a to 120l, the plurality of second touch electrode series 130 are sequentially marked as second touch electrode series 130a to 130l, and the plurality of third touch electrode series 140 are sequentially marked as third touch electrode series 140a to 140l. To prevent intricacy of the drawings, not all the electrode series are marked one by one. It should be understood that a quantity of the first touch electrode series 120a to 120l, a quantity of the second touch electrode series 130a to 130l, and a quantity of the third touch electrode series 140a to 140l shown in the drawings are examples only and are not intended to limit the scope of the present invention.

In the display area VA herein, first portions 122s and second portion 124s of most of the first touch electrode series 120 (for example, first touch electrode series 120a to 120k) are connected. For example, each of the first touch electrode series 120a to 120k includes a connection point C1 to connect the first portion 122 and the second portion 124 herein.

Similarly, third portions 132 and fourth portions 134 of most of the second touch electrode series 130 (for example, second touch electrode series 130a to 130k) are connected. For example, each of the second touch electrode series 130a to 130k includes a connection point C2 to connect the third portion 132 and the fourth portion 134.

Similarly, fifth portions 142 and sixth portions 144 of most of the third touch electrode series 140 (for example, third touch electrode series 140a to 140k) are connected. For example, each of the third touch electrode series 140a to 140k includes a connection point C3 to connect the fifth portion 142 and the sixth portion 144.

In some embodiments of the present invention, the connection point C2 of each second touch electrode series 130 and the first portion 122 of the first touch electrode series 120a overlap. The connection point C3 of each third touch electrode series 140 and the second portion 124 of the first touch electrode series 120a overlap. For example, the connection point C2 of an innermost second touch electrode series 130 (namely, the second touch electrode series 130a) and the first portion 122 of the first touch electrode series 120a overlap. The connection point C3 of an innermost third touch electrode series 140 (namely, the third touch electrode series 140a) and the second portion 124 of the first touch electrode series 120a overlap. In this embodiment, in view of that the first portion 122 of an innermost first touch electrode series 120 (namely, the first touch electrode series 120a) and the fifth portion 142 of the third touch electrode series 140a extend along a same first direction D1, the second portion 124 of the first touch electrode series 120a and the fourth portion 134 of the second touch electrode series 130a extend along a same second direction D2, and the third portion 132 of the second touch electrode series 130a and the sixth portion 144 of the third touch electrode series 140a extend along a same third direction D3, the innermost first to third touch electrode series (namely, the first touch electrode series 120a, the second touch electrode series 130a, and the third touch electrode series 140a) define a parallelogram therein.

Furthermore, in this embodiment, a distance from the connection point C2 of the innermost second touch electrode series 130 (namely, the second touch electrode series 130a) to the connection point C1 of the innermost first touch electrode series 120 (namely, the first touch electrode series 120a) is the same as a distance from the connection point C3 of the innermost third touch electrode series 140a (namely, the third touch electrode series 140a) to the connection point C1 of the innermost first touch electrode series 120 (namely, the first touch electrode series 120a), so that the innermost first to third touch electrode series (namely, the first touch electrode series 120a, the second touch electrode series 130a, and the third touch electrode series 140a) define a rhombus therein. For example, four vertices of the rhombus include the foregoing three connection points C1, C2, C3, and a crossing point of the fourth portion 134 of the second touch electrode series 130a and the fifth portion 142 of the third touch electrode series 140a, and four vertex angles of the rhombus are respectively 60 degrees and 120 degrees. Certainly, this should not limit the scope of the present invention. In other embodiments, the distance from the connection point C2 of the second touch electrode series 130a to the connection point C1 of the first touch electrode series 120a may be different from the distance from the connection point C3 of the third touch electrode series 140a to the connection point C1 of the first touch electrode series 120a.

Alternatively, in other words, a second innermost first touch electrode series 120 (namely, a first touch electrode series 120b), the innermost second touch electrode series 130 (namely, the second touch electrode series 130a), and the innermost third touch electrode series 140 (namely, the third touch electrode series 140a) define a hexagon therein. Because the included angle between the first direction D1 and the second direction D2 is 120 degrees, the included angle between the first direction D1 and the third direction D3 is 120 degrees, and the electrode series are evenly spaced in this embodiment, this hexagon is a regular hexagon.

In this embodiment, the touch panel 100 further includes a fourth touch electrode series 160. The fourth touch electrode series 160 intersects with the first touch electrode series 120 in an extension direction. For example, the fourth touch electrode series 160 intersects with a plurality of connection points C1 of the plurality of first touch electrode series 120 in the extension direction. Specifically, the fourth touch electrode series 160 extends along the third direction D3 and terminates at the connection point C1 of the innermost first touch electrode series 120 (namely, the first touch electrode series 120a) herein. There is only one fourth touch electrode series 160 herein. The fourth touch electrode series 160 and the first to third touch electrode series 120 to 140 are electrically insulated from each other. It should be understood that the fourth touch electrode series 160 is not an essential setting. In some other embodiments, the fourth touch electrode series 160 may be omitted, or may be replaced by the third portion 132 of the second touch electrode series 130 or the sixth portion 144 of the third touch electrode series 140 that extends along a same direction.

Figure 1C:
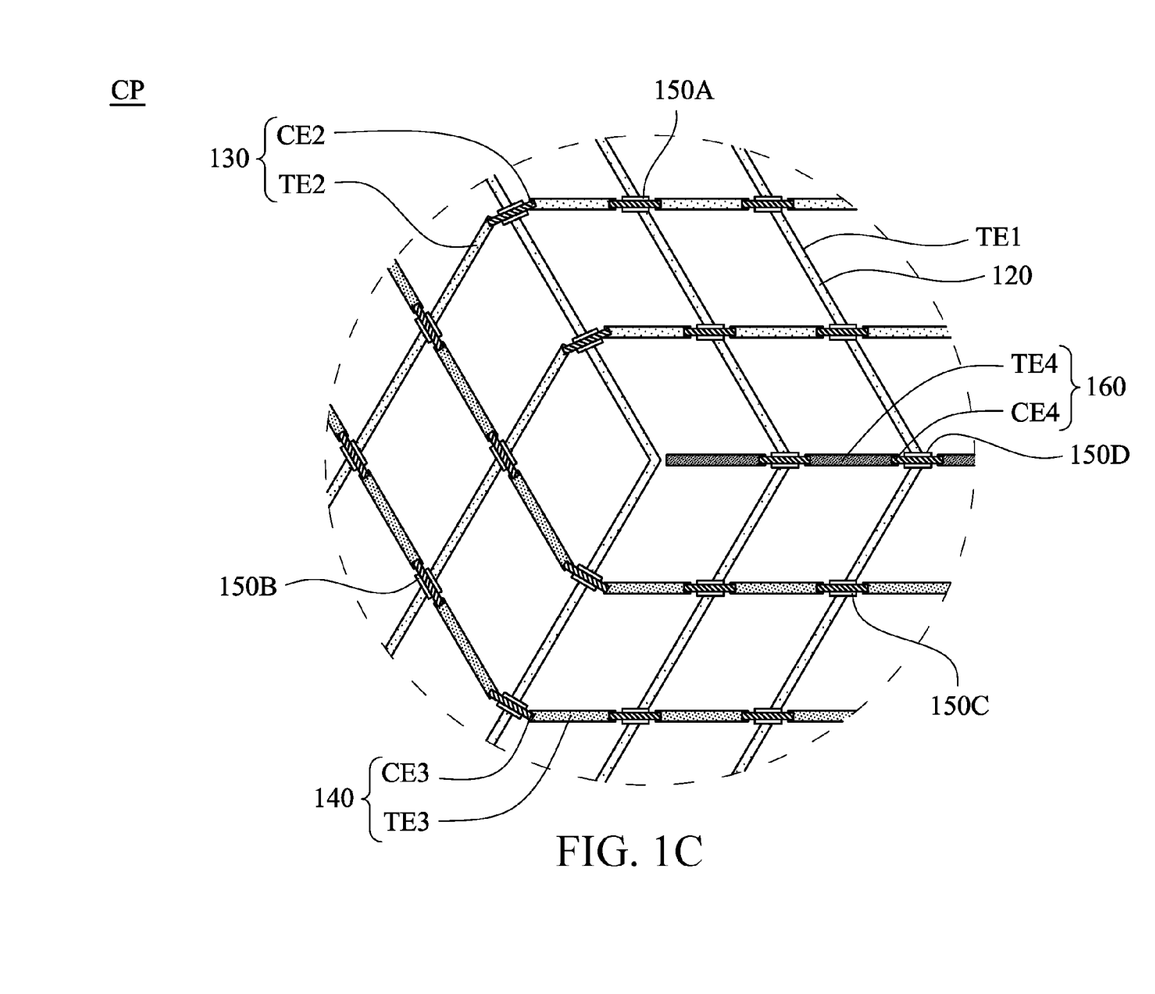
FIG. 1C is a schematic enlarged view of a portion CP in FIG. 1A.

FIG. 1C is a schematic enlarged view of a portion CP in FIG. 1A. Refer to both FIG. 1A and FIG. 1C. In multiple embodiments of the present invention, the "touch electrode series" includes a variety of conductive components of different materials, and is not limited to a component of a single layer or a single material. For example, in this embodiment, the first touch electrode series 120 includes a first touch electrode TE1. The second touch electrode series 130 includes a second touch electrode TE2 and a second connection cable CE2. The second connection cable CE2 connects two adjacent second touch electrodes TE2. The third touch electrode series 140 includes a third touch electrode TE3 and a third connection cable CE3. The third connection cable CE3 connects two adjacent third touch electrodes TE3. The fourth touch electrode series 160 includes a fourth touch electrode TE4 and a fourth connection cable CE4. The fourth connection cable CE4 connects two adjacent fourth touch electrodes TE4.

For convenience of observation herein, the first to fourth touch electrodes TE1 to TE4 are represented by grid point patterns of different densities, but it should be understood that materials of the first to fourth touch electrodes TE1 to TE4 may be the same herein. Specifically, the first to fourth touch electrodes TE1 to TE4 may be formed by a same patterned transparent electrode layer, for example, indium tin oxide (ITO). In some embodiments, the second to fourth connection cables CE2 to CE4 may be formed by a same patterned transparent conductive layer, for example, ITO, or a same patterned metal layer, for example, silver, copper, titanium, aluminum or nickel layer.

In multiple embodiments of the present invention, the touch panel 100 includes first to fourth insulation patterns 150A to 150D located on the first touch electrode series 120, the second touch electrode series 130, and the third touch electrode series 140. The first insulation pattern 150A insulates the first touch electrode TE1 of the first touch electrode series 120 from the second connection cable CE2 of the second touch electrode series 130. The second insulation pattern 150B insulates the second touch electrode TE2 of the second touch electrode series 130 from the third connection cable CE3 of the third touch electrode series 140. The third insulation pattern 150C insulates the first touch electrode TE1 of the first touch electrode series 120 from the third connection cable CE3 of the third touch electrode series 140. The fourth insulation pattern 150D insulates the first touch electrode TE1 of the first touch electrode series 120 from the fourth connection cable CE4 of the fourth touch electrode series 160. In some embodiments, the first to fourth insulation patterns 150A to 150D may be formed by a same patterned insulation layer, for example, silicon oxide, silicon nitride, and silicon oxynitride. Each of the first to fourth insulation patterns 150A to 150D and the second to fourth connection cables CE2 to CE4 may be designed to complete a staggered configuration of the touch electrode series herein.

A film layer where the first to fourth touch electrodes TE1 to TE4 are formed is located between a film layer where the second to fourth connection cables CE2 to CE4 are formed and the substrate 110 herein. In other embodiments, the film layer where the second to fourth connection cables CE2 to CE4 are formed may be designed to be located between the film layer where the first to fourth touch electrodes TE1 to TE4 are formed and the substrate 110.

It should be understood that the foregoing configuration of the "touch electrode series" is merely an example. In other embodiments, a relationship between the touch electrode of each touch electrode series and the connection cable may be appropriately designed. For example, the first touch electrode series 120 may be designed to include a connection cable, and the scope of the present invention should not be limited by what is shown in the drawings.

Figure 1D:
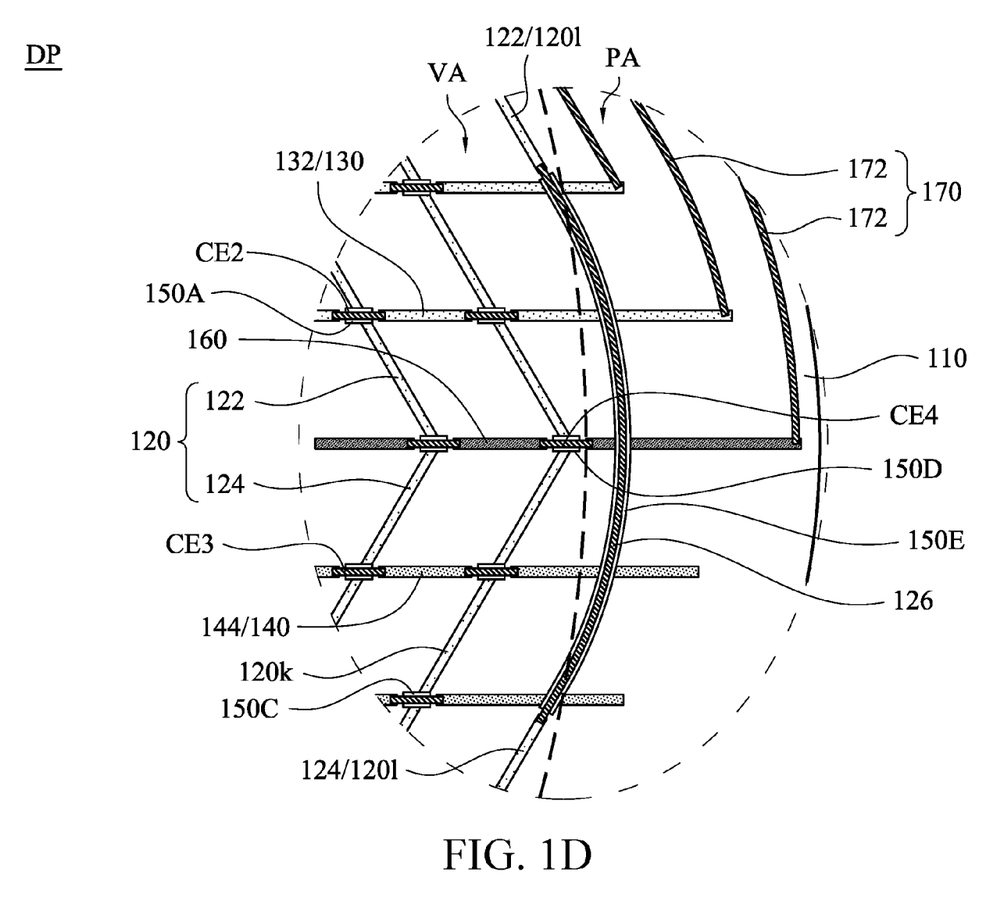
FIG. 1D is a schematic enlarged view of a portion DP in FIG. 1A.

FIG. 1D is a schematic enlarged view of a portion DP in FIG. 1A. Refer to both FIG. 1A and FIG. 1D. In some embodiments of the present invention, the touch panel 100 further includes a lead structure 170 and a joint connection pad 180, provided in the peripheral area PA of the substrate 110. The lead structure 170 includes a plurality of leads 172, configured to respectively connect the first portions 122 of the first touch electrode series 120a to 120l, the third portions 132 of the second touch electrode series 130a to 130l, the fifth portions 142 of the third touch electrode series 140a to 140l, and the fourth touch electrode series 160 to the joint connection pad 180. In this way, the lead structure 170 may be distributed in only an upper half of the peripheral area PA and does not need to be distributed in a lower half of the peripheral area PA, thereby reducing an area requirement for the peripheral area.

In multiple embodiments of the present invention, to maintain a same density of electrodes in the display area VA, the first touch electrode series 120a to 120l, the second touch electrode series 130a to 130l, and the third touch electrode series 140a to 140l are evenly spaced. In this setting, the first touch electrode series 120l, the second touch electrode series 130l, and the third touch electrode series 140l that are adjacent to the peripheral area PA do not include the connection points C1, C2, and C3. Specifically, the first portion 122 and the second portion 124 of the first touch electrode series 120l are structurally separate. Similarly, the third portion 132 and the fourth portion 134 of the second touch electrode series 130l are structurally separate. Similarly, the fifth portion 142 and the sixth portion 144 of the third touch electrode series 140l are structurally separate.

In some embodiments of the present invention, the first touch electrode series 120l includes a peripheral bridge line 126, configured to connect the first portion 122 and the second portion 124 of the first touch electrode series 120l. The touch panel 100 further includes a peripheral insulating portion 150E, provided in the peripheral area PA of the substrate 110, where the peripheral bridge line 126 is insulated from the second touch electrode series 130, the third touch electrode series 140, and the fourth touch electrode series 160 by the peripheral insulating portion 150E. In some embodiments of the present invention, the peripheral insulating portion 150E is located on the second touch electrode series 130, the third touch electrode series 140, and the fourth touch electrode series 160.

Similarity, the second touch electrode series 130l may further include a peripheral bridge line (not shown) to connect the third portion 132 and the fourth portion 134 of the second touch electrode series 130l, and be insulated from the first touch electrode series 120 and the third touch electrode series 140 by a peripheral insulating portion (not shown). The third touch electrode series 140l may further include a peripheral bridge line (not shown) to connect the fifth portion 142 and the sixth portion 144 of the third touch electrode series 140l, and be insulated from the first touch electrode series 120 and the second touch electrode series 130 by a peripheral insulating portion (not shown). A related configuration is approximately the same as that of the first touch electrode series 120*l*, and details are not described herein. In addition to the foregoing description, for another electrode series located in the peripheral area, a same structure may be used to implement connection or insulation.

For example, outermost touch electrode series do not include connection points C1, C2, and C3, but should not limit the present invention. In some embodiments of the present invention, some of the touch electrode series that are close to the peripheral area PA include no connection points, and some other of the touch electrode series that are far away from the peripheral area PA include connection points. For example, the first touch electrode series 120*k* and 120*l*, the second touch electrode series 130*k* and 130*l*, the third touch electrode series 140*k* and 140*l* may not include connection points C1, C2, and C3. Furthermore, in other embodiments, the first touch electrode series 120*j* to 120*l*, the second touch electrode series 130*j* to 130*l*, and the third touch electrode series 140*j* to 140*l* may not include connection points C1, C2, and C3.

In some embodiments, the leads 172, the peripheral bridge line 126, the second to fourth connection cables CE2 to CE4 may be formed by a same patterned transparent conductive layer or metal layer. In some embodiments of the present invention, the first to fourth insulation patterns 150A to 150D and the peripheral insulating portion 150E may be formed by a same patterned insulation layer. The separate insulation blocks are used as an example, but this is not intended to limit the scope of the present invention. In some embodiments, the first to fourth insulation patterns 150A to 150D and the peripheral insulating portion 150E may be a continuous insulation film layer. A plurality of through holes may be provided on the continuous insulation film layer for each connection cable/bridge line to be connected to the touch electrode.

In some embodiments of the present invention, the substrate 110 may be a transparent substrate and materials thereof may include glass, acryl or other appropriate materials. In some embodiments, the touch panel 100 may further include a light shielding layer (not shown) to define the display area VA and the peripheral area PA of the substrate 110. Specifically, the light shielding layer (not shown) includes an opening corresponding to the display area VA of the substrate 110. The substrate 110 may have a circular shape, and the display area VA may have a circular shape. That is, the light shielding layer (not shown) is arranged in the peripheral area PA by using an annular shape and includes a circular opening therein to define the display area VA.

It should be understood that, the scope of the present invention should not be limited by the same spacing. In some embodiments, the first touch electrode series 120*a* to 120*l* are evenly spaced, the second touch electrode series 130*a* to 130*l* are evenly spaced, and the third touch electrode series 140*a* to 140*l* are evenly spaced. The spacing of the first touch electrode series 120*a* to 120*l*, the spacing of the second touch electrode series 130*a* to 130*l*, and the spacing of the third touch electrode series 140*a* to 140*l* may be the same one another or different from each other. In other embodiments, the first touch electrode series 120*a* to 120*l* are not evenly spaced, the second touch electrode series 130*a* to 130*l* are not evenly spaced, and the third touch electrode series 140*a* to 140*l* are not are evenly spaced.

Figure 2:
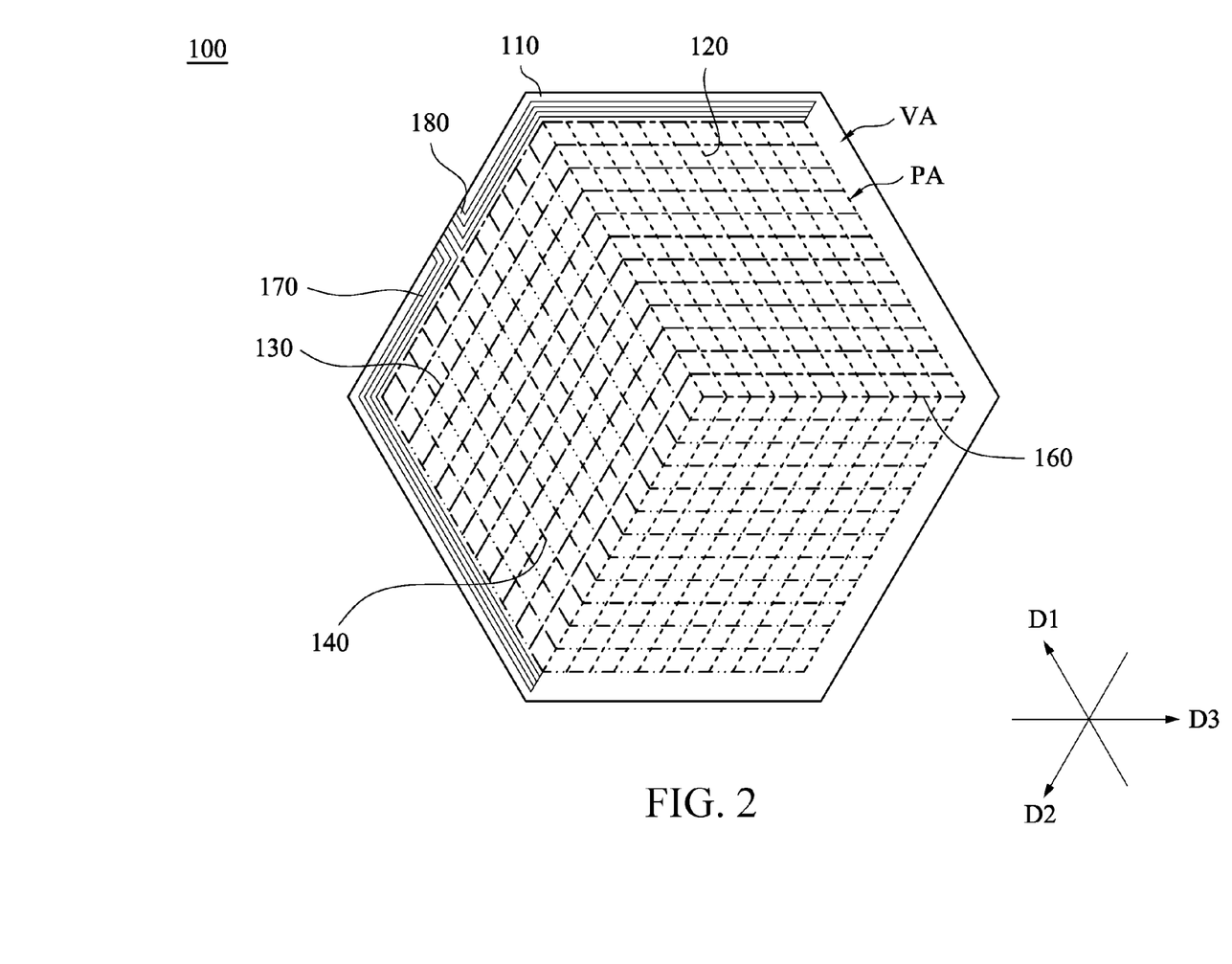
FIG. 2 is a schematic top view of a touch panel according to some embodiments of the present invention.

FIG. 2 is a schematic top view of a touch panel 100 according to some embodiments of the present invention. This embodiment is similar to the embodiment in FIG. 1A, and a difference lies in that: in this embodiment, the substrate 110 has a hexagonal shape. In some embodiments, the touch panel 100 may further include a light shielding layer (not shown) to define the display area VA and the peripheral area PA of the substrate 110. The display area VA may have a hexagonal shape herein. Specifically, the light shielding layer (not shown) is arranged in the peripheral area PA by using a hexagonal annular shape and includes a hexagonal opening corresponding to the display area VA of the substrate 110.

Other details of this embodiment are approximately the same as those described in the embodiment in FIG. 1A and are not described herein.

Figure 3:
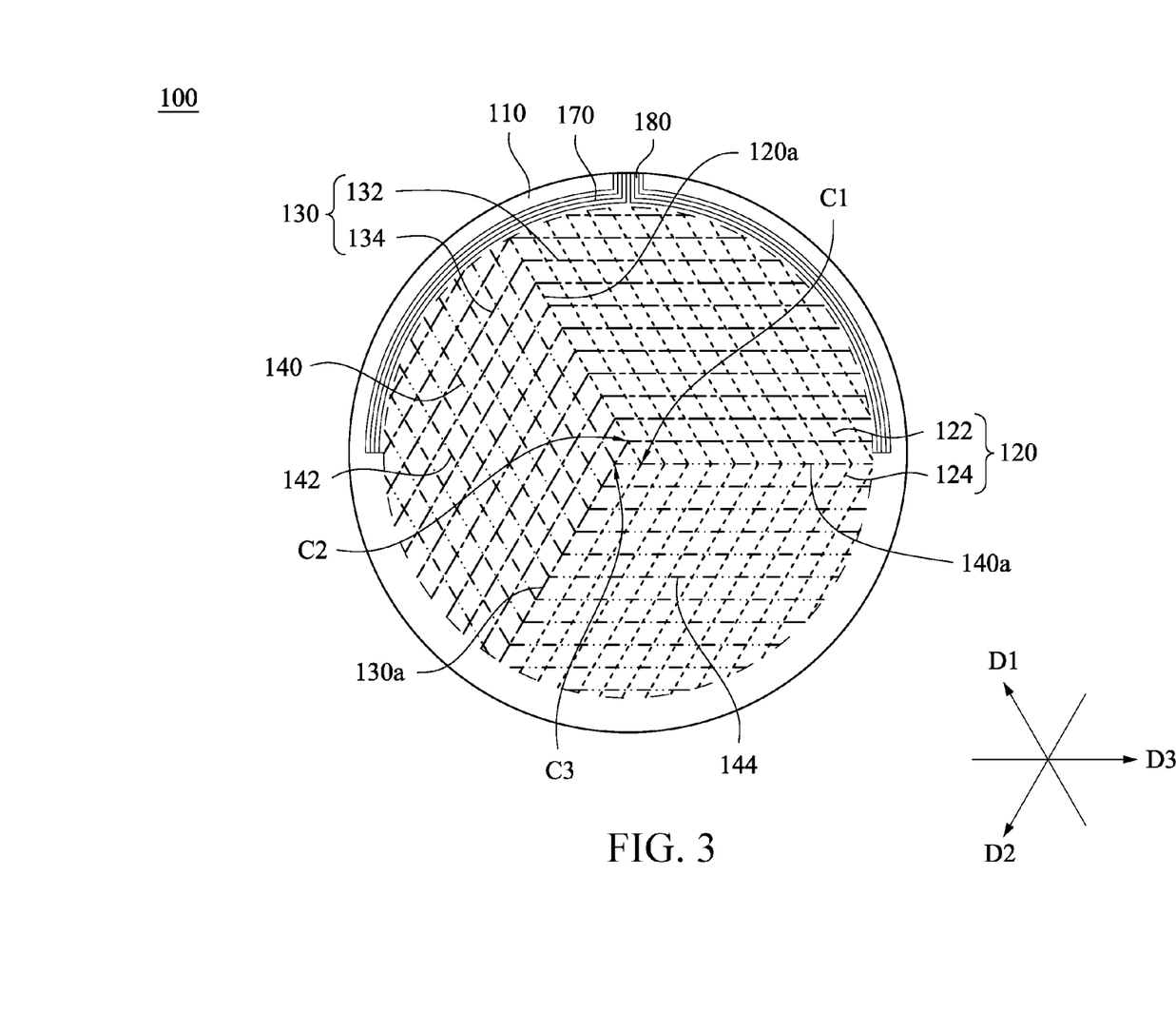
FIG. 3 is a schematic top view of a touch panel according to some embodiments of the present invention.

FIG. 3 is a schematic top view of a touch panel 100 according to some embodiments of the present invention. This embodiment is similar to the embodiment in FIG. 1A, and a difference lies in that: in this embodiment, the innermost first touch electrode series 120*a*, the innermost second touch electrode series 130*a* and the innermost third touch electrode series 140*a* define a triangle therein. In this embodiment, the touch panel 100 does not include a fourth touch electrode series 160.

The connection point C1 of the first touch electrode series 120*a* is located on the sixth portion 144 of the third touch electrode series 140*a* herein. The connection point C2 of the second touch electrode series 130*a* is located on the first portion 122 of the first touch electrode series 120*a*, and the connection point C3 of the third touch electrode series 140*a* is located on the fourth portion 134 of the second touch electrode series 130*a*.

In this embodiment, the distance from the connection point C2 of the second touch electrode series 130*a* to the connection point C1 of the first touch electrode series 120*a*, the distance from the connection point C3 of the third touch electrode series 140*a* to the connection point C1 of the first touch electrode series 120*a*, and the distance from the connection point C2 of the second touch electrode series 130*a* to the connection point C3 of the third touch electrode series 140*a* are the same. Because the included angle between the first direction D1 and the second direction D2 is 120 degrees, the included angle between the first direction D1 and the third direction D3 is 120 degrees herein, the triangle defined in extension directions of the innermost first touch electrode series 120*a*, the innermost second touch electrode series 130*a* and the innermost third touch electrode series 140*a* is a regular triangle.

Other details of this embodiment are approximately the same as those described in the embodiment in FIG. 1A and are not described herein.

Figure 4:
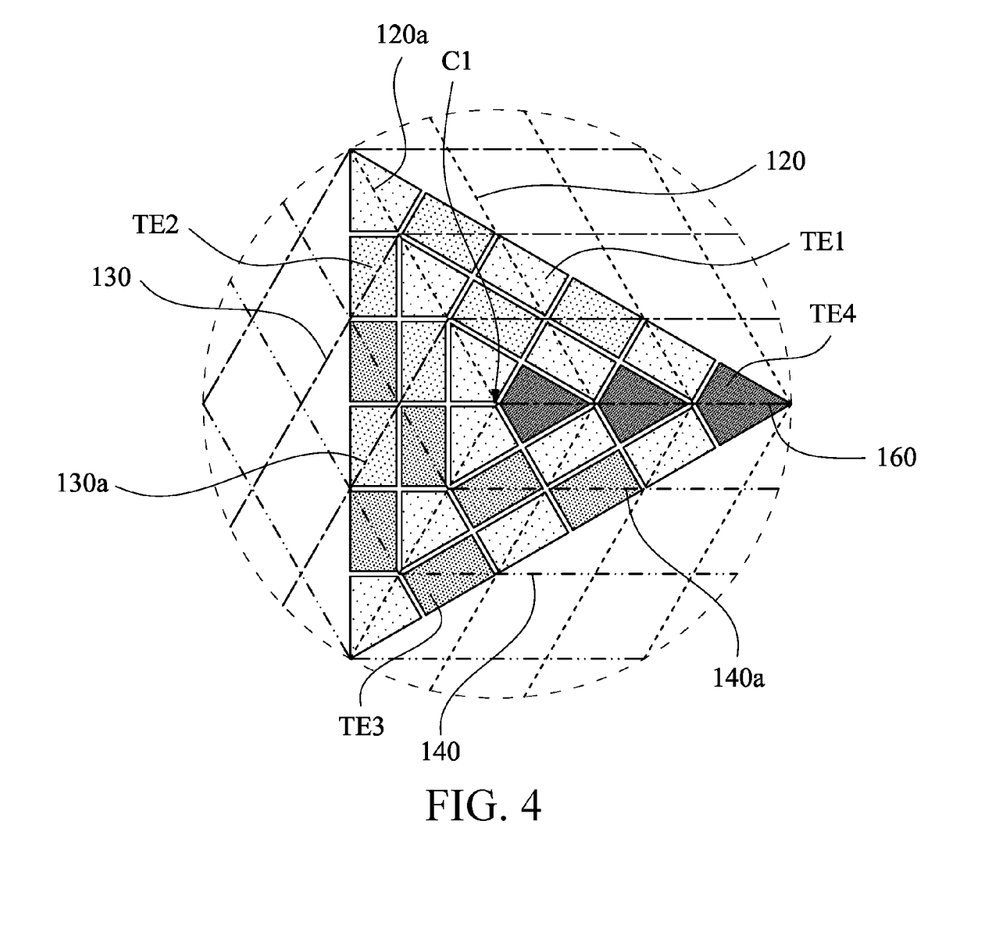
FIG. 4 is a schematic enlarged top view of a part of a touch panel according to some embodiments of the present invention.

FIG. 4 is a schematic enlarged top view of a central part of a touch panel 100 according to some embodiments of the present invention. In this embodiment, the extension directions of the innermost first to third touch electrode series (namely, the first touch electrode series 120*a*, the second touch electrode series 130*a*, and the third touch electrode series 140*a*) define a parallelogram therein, and the first to third touch electrodes TE1 to TE3 having various appropriate shapes such as a rectangular shape or a diamond-like shape may be made.

In some embodiments of the present invention, shapes of the first to third touch electrodes TE1 to TE3 change with distribution of extension directions of the electrode series. Specifically, for the innermost first touch electrode series 120 (namely, the first touch electrode series 120*a*), the first touch electrode TE1 thereof may have a diamond-like shape, and the fourth touch electrode TE4 of the fourth touch electrode series 160 may also have a diamond-like shape. In this way, when adjacent to the connection point C1 of the first touch electrode series 120a, the first touch electrode TE1 and the fourth touch electrode TE4 form a triangle. For other first touch electrode series 120, second touch electrode series 130, and third touch electrode series 140, the first touch electrode TE1, the second touch electrode TE2, and the third touch electrode TE3 may have rectangular shapes, and a diagonal line of each rectangle is arranged along the extension direction of each electrode series.

It should be understood that the foregoing setting of shapes is merely an example, and should not limit the scope of the present invention. Other details of this embodiment are approximately the same as those described above and are not described herein.

Figure 5:
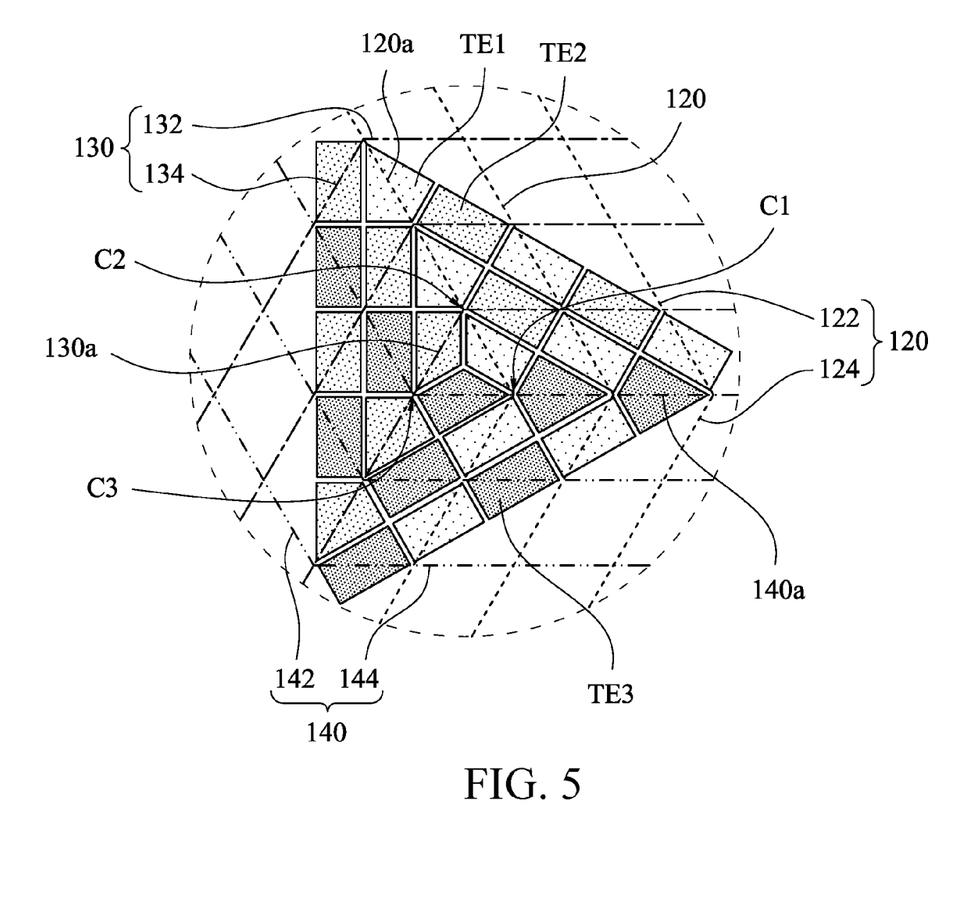
FIG. 5 is a schematic enlarged top view of a part of a touch panel according to some embodiments of the present invention.

FIG. 5 is a schematic enlarged top view of a central part of a touch panel 100 according to some embodiments of the present invention. This embodiment is similar to the embodiment in FIG. 4, and a difference lies in that: in this embodiment, the extension directions of the innermost first touch electrode series 120, the innermost second touch electrode series 130, and the innermost third touch electrode series 140 define a triangle therein, and when being electrically separated from each other, the first to third touch electrodes TE1 to TE3 of the innermost first to third touch electrode series 120 to 140 (namely, the first touch electrode series 120a, the second touch electrode series 130a, and the third touch electrode series 140a) can expand an area of the touch electrodes as much as possible in this triangle.

In some embodiments, shapes and sizes of the first to third touch electrodes TE1 to TE3 are similar. For example, each of the first to third touch electrodes TE1 to TE3 of the first portion 122, the fourth portion 134, and the sixth portion 144 of the innermost first to third touch electrode series 120 to 140 (namely, the first touch electrode series 120a, the second touch electrode series 130a, and the third touch electrode series 140a) has a diamond-like shape, and includes sides having the same length as one another. Each of the first to third touch electrodes TE1 to TE3 of the second portion 124, the third portion 132, and the fifth portion 142 has a rectangular shape. Each of the first to third touch electrodes TE1 to TE3 of the first portion 122, the fourth portion 134, and the sixth portion 144 that are adjacent to the innermost points C1, C2, and C3 has a trapezoidal shape in a same size. In other first to third touch electrode series 120 to 140 (for example, besides the first touch electrode series 120a, the second touch electrode series 130a, and the third touch electrode series 140a), each of the first to third touch electrodes TE1 to TE3 of the first portion 122, the second portion 124, the third portion 132, the fourth portion 134, the fifth portion 142, and the sixth portion 144 has a rectangular shape. In other embodiments, other appropriate shapes may be designed.

Other details of this embodiment are approximately as those described above and are not described herein.

In multiple embodiments of the present invention, three touch electrode series intersect with each other, and each touch electrode series includes two portions extending along different directions. In this way, the touch electrode series can adapt to a substrate that has a hexagonal shape or even a circular shape. This setting can reduce a quantity of the touch electrode series, thereby reducing a quantity of leads to obtain a narrow bezel, and has a relatively low requirement for the performance of a drive chip and an I/O quantity. In addition, with the setting of a circular panel, leads need to be distributed on only a half of a peripheral area PA, and an area requirement for the peripheral area can be reduced. Moreover, for a touch electrode series adjacent to the peripheral area, an extra connection cable may be designed to enhance touch sensitivity at edges.

Although the present invention has been disclosed above by using multiple embodiments, the multiple embodiments are not intended to limit the present invention. Any person skilled in the art may make various modifications and variations to the present invention, without departing from the spirit and scope of the present invention. Therefore, the protection scope of the present invention should be defined by the appended claims.

What is claimed is:

1. A touch panel, comprising:
   a substrate, comprising a display area and a peripheral area;
   a plurality of first touch electrode series, wherein each first touch electrode series comprises:
      a first portion, extending along a first direction;
      a second portion, extending along a second direction, wherein the first direction is different from the second direction;
   a plurality of second touch electrode series, wherein each second touch electrode series comprises:
      a third portion, extending along a third direction and intersecting with the first portions of at least some of the first touch electrode series, wherein the third direction is different from the first direction and the second direction; and
      a fourth portion, extending along the second direction;
   a plurality of third touch electrode series, wherein each third touch electrode series comprises:
      a fifth portion, extending along the first direction and intersecting with the fourth portions of at least some of the second touch electrode series; and
      a sixth portion, extending along the third direction and intersecting with the second portions of at least some of the first touch electrode series, wherein the first touch electrode series, the second touch electrode series, and the third touch electrode series are provided on the substrate; and
   a plurality of insulation patterns, respectively insulating the first touch electrode series from the second touch electrode series, configured to insulate the second touch electrode series from the third touch electrode series, and configured to insulate the first touch electrode series from the third touch electrode series;
   wherein an included angle between the first direction and the second direction is 120 degrees.

2. The touch panel according to claim 1, wherein each first touch electrode series comprises a first touch electrode, each second touch electrode series comprises a second touch electrode, each third touch electrode series comprises a third touch electrode, and the first touch electrodes, the second touch electrodes, and the third touch electrodes are formed by using a same patterned electrode layer.

3. The touch panel according to claim 2, wherein each first touch electrode, each second touch electrode, and each third touch electrode is a strip form, a rectangular shape, or a diamond-like shape.

4. The touch panel according to claim 1, further comprising:
   a lead structure, respectively connected to the first portion of each first touch electrode series, the third portion of each second touch electrode series, and the fifth portion of each third touch electrode series.

5. The touch panel according to claim 1, wherein the first touch electrode series comprise an outermost first touch electrode series that is adjacent to the peripheral area, and the outermost first touch electrode series comprises a peripheral bridge line that is located in the peripheral area and is connecting to a first portion and a second portion of the outermost first touch electrode series.

6. The touch panel according to claim 1, wherein the insulation patterns are located on the first touch electrode series, the second touch electrode series, and the third touch electrode series.

7. The touch panel according to claim 1, wherein an innermost first touch electrode series, an innermost second touch electrode series, and an innermost third touch electrode series define a triangle therein.

8. The touch panel according to claim 7, wherein the triangle is a regular triangle.

9. The touch panel according to claim 7, wherein each first touch electrode series further comprises a first connection point connected between the first portion and the second portion, each second touch electrode series further comprises a second connection point connected between the third portion and the fourth portion, and each third touch electrode series further comprises a third connection point connected between the fifth portion and the sixth portion, wherein each first connection point and the innermost third touch electrode series overlap, each second connection point and the innermost first touch electrode series overlap, and each third connection point and the innermost second touch electrode series overlap.

10. The touch panel according to claim 1, further comprising:
a fourth touch electrode series, extending along the third direction and intersecting with at least some of the first touch electrode series.

11. The touch panel according to claim 10, wherein each first touch electrode series further comprises a first connection point connected between the first portion and the second portion, each second touch electrode series further comprises a second connection point connected between the third portion and the fourth portion, and each third touch electrode series further comprises a third connection point connected between the fifth portion and the sixth portion, wherein each first connection point and the fourth touch electrode series overlap, each second connection point and the first portion of the innermost first touch electrode series overlap, and each third connection point and the second portion of the innermost first touch electrode series overlap.

12. The touch panel according to claim 1, wherein the substrate is a circular shape or a hexagonal shape.

13. The touch panel according to claim 1, wherein the first touch electrode series, the second touch electrode series, and the third touch electrode series are evenly spaced.

14. A touch panel, comprising:
a substrate, comprising a display area and a peripheral area;
a plurality of first touch electrode series, wherein each first touch electrode series comprises:
  a first portion, extending along a first direction;
  a second portion, extending along a second direction, wherein the first direction is different from the second direction;
a plurality of second touch electrode series, wherein each second touch electrode series comprises:
  a third portion, extending along a third direction and intersecting with the first portions of at least some of the first touch electrode series, wherein the third direction is different from the first direction and the second direction; and
  a fourth portion, extending along the second direction;
a plurality of third touch electrode series, wherein each third touch electrode series comprises:
  a fifth portion, extending along the first direction and intersecting with the fourth portions of at least some of the second touch electrode series; and
  a sixth portion, extending along the third direction and intersecting with the second portions of at least some of the first touch electrode series, wherein the first touch electrode series, the second touch electrode series, and the third touch electrode series are provided on the substrate; and
a plurality of insulation patterns, respectively insulating the first touch electrode series from the second touch electrode series, configured to insulate the second touch electrode series from the third touch electrode series, and configured to insulate the first touch electrode series from the third touch electrode series;
wherein an included angle between the first direction and the third direction is 120 degrees.

15. A touch panel, comprising:
a substrate, comprising a display area and a peripheral area;
a plurality of first touch electrode series, wherein each first touch electrode series comprises:
  a first portion, extending along a first direction;
  a second portion, extending along a second direction, wherein the first direction is different from the second direction;
a plurality of second touch electrode series, wherein each second touch electrode series comprises:
  a third portion, extending along a third direction and intersecting with the first portions of at least some of the first touch electrode series, wherein the third direction is different from the first direction and the second direction; and
  a fourth portion, extending along the second direction;
a plurality of third touch electrode series, wherein each third touch electrode series comprises:
  a fifth portion, extending along the first direction and intersecting with the fourth portions of at least some of the second touch electrode series; and
  a sixth portion, extending along the third direction and intersecting with the second portions of at least some of the first touch electrode series, wherein the first touch electrode series, the second touch electrode series, and the third touch electrode series are provided on the substrate; and
a plurality of insulation patterns, respectively insulating the first touch electrode series from the second touch electrode series, configured to insulate the second touch electrode series from the third touch electrode series, and configured to insulate the first touch electrode series from the third touch electrode series;
wherein an innermost first touch electrode series of the first touch electrode series, an innermost second touch electrode series of the second touch electrode series, and an innermost third touch electrode series of the third touch electrode series define a rhombus therein; and
wherein a vertex angle of the rhombus is 60 degrees.

* * * * *